(12) United States Patent
Owen et al.

(10) Patent No.: US 8,279,204 B1
(45) Date of Patent: Oct. 2, 2012

(54) VIEWER FOR MULTI-DIMENSIONAL DATA FROM A TEST ENVIRONMENT

(75) Inventors: James G. Owen, Bolton, MA (US); Lynn M. Cherny, Framingham, MA (US); Jenifer Tidwell, Arlington, MA (US); Rong Chen, Vernon, CT (US)

(73) Assignee: The MathWorks, Inc., Natick, MA (US)

( * ) Notice: Subject to any disclaimer, the term of this patent is extended or adjusted under 35 U.S.C. 154(b) by 1171 days.

(21) Appl. No.: 11/317,423

(22) Filed: Dec. 22, 2005

(51) Int. Cl.
*G09G 5/00* (2006.01)

(52) U.S. Cl. .......................... 345/204; 345/1.1; 345/1.2

(58) Field of Classification Search .................. 345/1.1, 345/1.2, 204, 418, 501, 502, 505, 530, 419, 345/426, 690; 702/183, 179, 77; 714/736, 714/714, 723, 727, 738, 742; 717/105, 117; 342/357.57; 370/395.5; 382/268, 275, 260, 382/279, 286, 277; 324/750.12

See application file for complete search history.

(56) References Cited

U.S. PATENT DOCUMENTS

| | | | | | |
|---|---|---|---|---|---|
| 4,817,093 | A | * | 3/1989 | Jacobs et al. ................... | 714/728 |
| 5,369,738 | A | * | 11/1994 | Bremner, III ................. | 345/426 |
| 5,618,744 | A | * | 4/1997 | Suzuki et al. ................. | 438/599 |
| 5,657,247 | A | * | 8/1997 | Daniel et al. ................... | 709/231 |
| 5,892,949 | A | * | 4/1999 | Noble ........................... | 717/125 |
| 6,363,320 | B1 | * | 3/2002 | Chou ............................ | 701/446 |
| 6,545,500 | B1 | * | 4/2003 | Field ......................... | 324/750.12 |
| 6,567,791 | B2 | * | 5/2003 | Lent et al. ....................... | 705/38 |
| 6,751,359 | B1 | * | 6/2004 | Handley ........................ | 382/260 |
| 6,774,813 | B2 | * | 8/2004 | van Ee et al. ............. | 340/825.69 |
| 6,778,710 | B1 | * | 8/2004 | Handley ........................ | 382/260 |
| 6,978,401 | B2 | | 12/2005 | Avvari et al. | |
| 7,043,343 | B1 | * | 5/2006 | Houlberg et al. ................. | 701/1 |
| 7,165,074 | B2 | | 1/2007 | Avvari et al. | |

(Continued)

FOREIGN PATENT DOCUMENTS

WO  WO 03065890  *  8/2003

OTHER PUBLICATIONS

TDB-ACC-No. NN8803411 Disclosure Title: Interactive Layout Facility for Display of Array Device Failure Cell Maps Publication-Data: IBM Technical Disclosure Bulletin, Mar. 1988, US vol. No. 30 Issue No. 10 p. No. 411-413 Publication-Date: Mar. 1, 1988 Cross Reference: 0018-8689-30-10-411.*

*Primary Examiner* — Prabodh M Dharia
(74) *Attorney, Agent, or Firm* — Nelson Mullins Riley & Scarborough LLP (57) ABSTRACT

A viewer tool for viewing data in a software environment provides features for viewing and exploring a data set. The data set may be a multi-dimensional data set. The viewer tool may be coupled to a test environment that generates data from the tests of a unit under test (UUT). The data may be generated from one or more sequences of tests that can be divided into batches. The viewer tool may receive the data from the test environment and analyze the data to provide a user with useful information on the data. The viewer tool may display the data with the information so that the user can obtain the information on the data. In particular, the viewer tool identifies the relationship between the measured test data and the various test conditions under which the test data has been measured.

40 Claims, 8 Drawing Sheets

U.S. PATENT DOCUMENTS

| | | | |
|---|---|---|---|
| 7,167,870 B2 | 1/2007 | Avvari et al. | |
| 7,183,970 B1* | 2/2007 | Houlberg et al. | 342/357.57 |
| 7,231,553 B2* | 6/2007 | Stephens et al. | 714/32 |
| 7,240,243 B2* | 7/2007 | Decker | 714/33 |
| 7,278,059 B2* | 10/2007 | Hughes | 714/38.14 |
| 7,281,165 B2* | 10/2007 | Liu et al. | 714/37 |
| 7,292,990 B2 | 11/2007 | Hughes | |
| 7,302,421 B2* | 11/2007 | Aldridge | 1/1 |
| 7,345,700 B2* | 3/2008 | Nortrup | 348/180 |
| 7,395,167 B2* | 7/2008 | Frolik | 702/113 |
| 7,430,337 B2* | 9/2008 | Deshpande et al. | 382/275 |
| 7,480,589 B2* | 1/2009 | Ii | 702/179 |
| 7,539,591 B2* | 5/2009 | House et al. | 702/122 |
| 7,639,849 B2* | 12/2009 | Kimpe et al. | 382/128 |
| 2002/0077807 A1* | 6/2002 | Davis et al. | 704/8 |
| 2002/0091991 A1* | 7/2002 | Castro | 717/106 |
| 2003/0093737 A1* | 5/2003 | Purtell et al. | 714/738 |
| 2003/0112234 A1* | 6/2003 | Brown et al. | 345/419 |
| 2003/0195897 A1* | 10/2003 | Agrafiotis et al. | 707/101 |
| 2003/0200244 A1 | 10/2003 | Abraham et al. | |
| 2003/0212661 A1 | 11/2003 | Avvari et al. | |
| 2003/0212924 A1 | 11/2003 | Avvari et al. | |
| 2004/0025088 A1 | 2/2004 | Avvari et al. | |
| 2004/0044933 A1* | 3/2004 | Jeddeloh | 714/718 |
| 2004/0054950 A1* | 3/2004 | Larson et al. | 714/727 |
| 2004/0098643 A1* | 5/2004 | Schulz | 714/718 |
| 2005/0027656 A1* | 2/2005 | Tobler et al. | 705/53 |
| 2005/0028062 A1* | 2/2005 | Herrmann et al. | 714/736 |
| 2005/0102292 A1* | 5/2005 | Tamayo et al. | 707/10 |
| 2005/0144547 A1* | 6/2005 | Li | 714/738 |
| 2005/0147319 A1* | 7/2005 | Deshpande et al. | 382/268 |
| 2005/0166063 A1* | 7/2005 | Huang | 713/186 |
| 2005/0192777 A1* | 9/2005 | Banfer | 702/183 |
| 2005/0268171 A1* | 12/2005 | House et al. | 714/32 |
| 2006/0061547 A1* | 3/2006 | Bramwell et al. | 345/156 |
| 2006/0165311 A1* | 7/2006 | Watson | 382/286 |
| 2006/0262147 A1* | 11/2006 | Kimpe et al. | 345/690 |
| 2006/0291473 A1* | 12/2006 | Chase et al. | 370/395.5 |
| 2007/0043994 A1* | 2/2007 | Rosen | 714/742 |
| 2007/0052582 A1* | 3/2007 | Houlberg et al. | 342/357.06 |
| 2007/0053513 A1* | 3/2007 | Hoffberg | 380/201 |
| 2007/0080280 A1* | 4/2007 | Havens | 250/201.1 |
| 2007/0220479 A1 | 9/2007 | Hughes | |
| 2008/0002910 A1* | 1/2008 | Ojima et al. | 382/277 |
| 2008/0038098 A1* | 2/2008 | Ito et al. | 414/222.01 |
| 2008/0097712 A1* | 4/2008 | Bruce et al. | 702/77 |
| 2008/0120129 A1* | 5/2008 | Seubert et al. | 705/1 |
| 2008/0144186 A1* | 6/2008 | Feng et al. | 359/666 |
| 2008/0172655 A1 | 7/2008 | Davia | |
| 2008/0209392 A1* | 8/2008 | Able et al. | 717/105 |
| 2009/0044177 A1 | 2/2009 | Bates et al. | |
| 2010/0095158 A1* | 4/2010 | Shah-Hosseini | 714/37 |
| 2010/0329585 A1* | 12/2010 | Watson | 382/279 |

* cited by examiner

VIEWER FOR MULTI-DIMENSIONAL DATA FROM A TEST ENVIRONMENT

FIELD OF THE INVENTION

The present invention relates generally to a viewer for viewing data, and more particularly to a method, system and medium for providing a viewer for viewing multidimensional data from a test environment.

BACKGROUND OF THE INVENTION

Data is often stored in a tabular (i.e. matrix) format or in a multiple dimensional array format. The resultant data structures are often referred to as look-up tables. Basic look-up tables are two-dimensional and have a matrix-like structure, such as found in spreadsheets. Typically, each element of a matrix is a numerical quantity, which can be precisely located by two indexing variables. At higher dimensions, multiple dimension data sets are represented as a collection of matrices or one or more cubes, whose elements are described in terms of a corresponding member of indexing variables.

Many software environments provide a viewer for viewing data generated or utilized in the software environments. The software environment may include or be coupled to a test environment for testing an operational feature of a unit under test (UUT). The test environment may include a test executive for managing execution of code used for testing the UUT. The test executive is capable of launching, editing, debugging, managing and recording data for programs designed to test UUT. The test executive may perform a test for testing the UUT and generate a data set from the test of the UUT. The viewer may receive the data from the test executive and analyze the data to provide a user with information on the data. The data can be multi-dimensional. When the viewer displays the data, it is useful for the user to view the data in a way that the user can understand the relationship between the measured data set and the test conditions under which the data set is generated.

SUMMARY OF THE INVENTION

The present invention provides a tool for viewing data in a software environment. The data may be a multi-dimensional data set. The viewer tool of the present invention provides various features for viewing and exploring the data set. The viewer tool may be coupled to a test environment that generates data from the tests of a unit under test (UUT). The data may be generated from one or more sequences of tests that can be divided into batches. The viewer tool may receive the data from the test environment and analyze the data to provide a user with information on the data. The viewer tool may display the data with the information so that the user can obtain the information on the data. In particular, the viewer tool of the present invention may enable the user to understand the relationship between the measured test data and the various test conditions under which the test data has been measured.

The viewer tool may include a feature for including and excluding tests using customizable mathematical or logical criteria. The viewer tool may filter tests based on the user-defined mathematical or logical criteria. The term 'filtering' is used to refer to excluding tests from viewing in the illustrative implementation of the present invention. The viewer tool may also include a feature for summarizing the data derived from a batch of tests. The tool may identify statistics of the data across all and describe the sizes and types of the data tests. Identification of statistics may be performed both before and after tests have been excluded using the mathematical or logical criteria. This provides user feedback on the affects of applying those exclusion criteria. The viewer tool may include a feature for viewing the data which allows the exploration of relationships between variables across multiple tests. The viewer may enable the user to explore relationships between a variable and more than two other variables. The tool may also include a feature for linking the graphical representation of the data back to the tests which generate the data.

In accordance with one aspect of the present invention, a method is provided for displaying data on a display. The method receives the data generated from a plurality of tests for testing a unit under test in a test environment. A user is enabled to input mathematical or logical criteria. In response to the user input, the method selects at least a portion of the plurality of tests based on the mathematical or logical criteria. The data is displayed on the display that is generated from the portion of the plurality of tests.

In accordance with another aspect of the present invention, a system is provided for displaying data on a display. The system includes a test environment for testing a unit under test. The test environment performs a plurality of tests and generates data from the plurality of tests. The system also includes a viewer tool for enabling a user to input mathematical or logical criteria to select at least a portion of the plurality of tests. The viewer tool displays the data on the display that is generated from the portion of the plurality of tests.

In another aspect of the present invention, a medium is provided for holding instructions executed in a computing device to perform a method of displaying data on a display. The instructions are executed to receive the data generated from a plurality of tests for testing a unit under test in a test environment. A user is enabled to input mathematical or logical criteria. In response to the user input, the instructions are executed to select at least a portion of the plurality of tests based on the mathematical or logical criteria. The data is displayed on the display that is generated from the portion of the plurality of tests.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a viewer tool for displaying data generated from a test environment. The data can be multi-dimensional. The viewer tool may be coupled to the test environment and receive the data from the test environment. The test environment may perform a sequence of tests for testing the operational feature of a unit under test (UUT). The tests can be divided into batches and the data may be generated from one or more batches of tests. The test environment may include a test executive for managing the execution of code used for testing the UUT. In the illustrative embodiment, the term "test executive" is used to refer to a software program capable of launching, editing, debugging, managing and recording data for programs designed to test the UUT.

In the illustrative embodiment, the viewer tool may receive the data from the test executive and analyze the data to provide a user with useful information on the data. The viewer tool may display the data in such a manner that the user can easily obtain the information on the data. The viewer tool may include and exclude a portion of the tests using customizable mathematical or logical criteria. The viewer tool may summarize the data derived from a batch of tests. The viewer tool may display the data to allow a user to explore the relationship between variables across multiple tests. The tool may also link the graphical representation of the data back to the tests that generate the data. In the illustrative embodiment, the viewer tool enables the user to understand the relationship between the measured test data and the various test conditions under which the test data has been measured.

Figure 1:
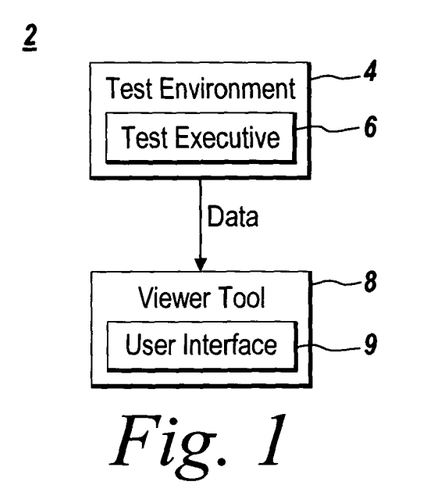
FIG. 1 depicts an exemplary system suitable for practicing the illustrative embodiment of the present invention.

FIG. 1 is an exemplary system 2 suitable for practicing the illustrative embodiment of the present invention. The system 2 includes a test environment 4 and a viewer tool 8 coupled to the test environment 4. The test environment 4 enables a user, such as a programmer and a designer, to test the operational feature of a UUT. The UUT can be hardware and/or software that the user is developing. The test environment 4 includes a test executive 6 for performing a sequence of tests for testing the UUT. The test executive 6 performs the tests using various resource programs or software products and generates test data from the tests. The test environment will be described below in more detail with reference to FIG. 3.

The viewer tool 8 receives the data generated from the tests in the test environment and analyzes the data to display to the user useful information on the data. The viewer tool 8 may include user interfaces 9 for receiving user inputs and displaying the data based on the user inputs. From the data displayed in the user interfaces 9, the designer or programmer can easily understand the test conditions under which the data is generated. Although the viewer tool 8 is described separately from the test environment 4 in the illustrative embodiment, one of ordinary skill in the art will appreciate that the viewer tool 8 can be incorporated into the test environment 4.

One of ordinary skill in the art will also appreciate that the test environment 4 and the viewer tool 8 may be provided on the same computing device, which will be described below in more detail with reference to FIG. 2, or alternatively, the test environment 4 and the viewer tool 8 may be coupled to each other via a communication network, which will be described below in more detail with reference to FIG. 3.

Figure 2:
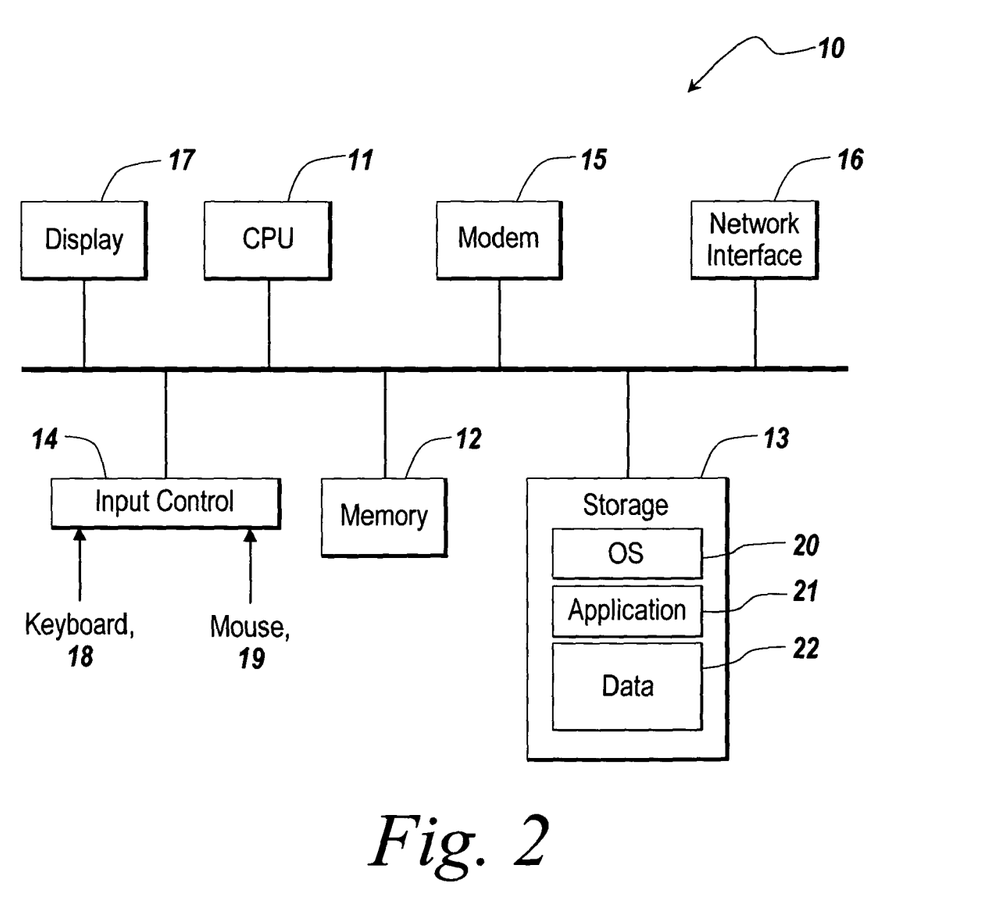
FIG. 2 is an exemplary computing device for implementing the illustrative embodiment of the present invention.

FIG. 2 is an exemplary computing device 10 suitable for practicing the illustrative embodiment of the present invention. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include a Central Processing Unit (CPU) 11, memory 12, storage 13, an input control 14, a modem 15, a network interface 16, a display 17, etc. The CPU 11 controls each component of the computing device 10 to provide the test environment 4 and the viewer tool 8. The memory 12 temporarily stores instructions and data and provides them to the CPU 11 so that the CPU 11 operates the computing device 10 and runs the test executive 6 and/or the viewer tool 8.

Optionally, the computing device 10 may include multiple CPUs for executing software loaded in the memory 12, and other programs for controlling system hardware. Each of the CPUs can be a single or multiple core processor. The code loaded in the memory 12 may run in a virtualized environment, such as in a Virtual Machine (VM). Multiple VM's may be resident on a single processor. Also, part of the application could be run in hardware, for example, by configuring a field programmable gate array (FPGA) or creating an application specific integrated circuit (ASIC).

The storage 13 usually contains software tools for applications. The storage 13 includes, in particular, code 20 for the operating system (OS) of the device 10, code 21 for applications running on the operation system including the test executive 6 and/or the viewer tool 8, and data 22 generated from the test environment 4. Those of ordinary skill in the art will appreciate that the application can be stored in the memory 12 as well, much like the data, and even the OS, or they can be stored on the network described below with reference to FIG. 3.

The input control 14 may interface with a keyboard 18, a mouse 19, and other input devices. The computing device 10 may receive through the input control 14 input data, such as the input data for selecting or filtering tests, which will be described below with reference to FIGS. 5-12. The computing device 10 may display on the display 17 user interfaces 9 for displaying the data generated in the test environment 4.

Figure 3:
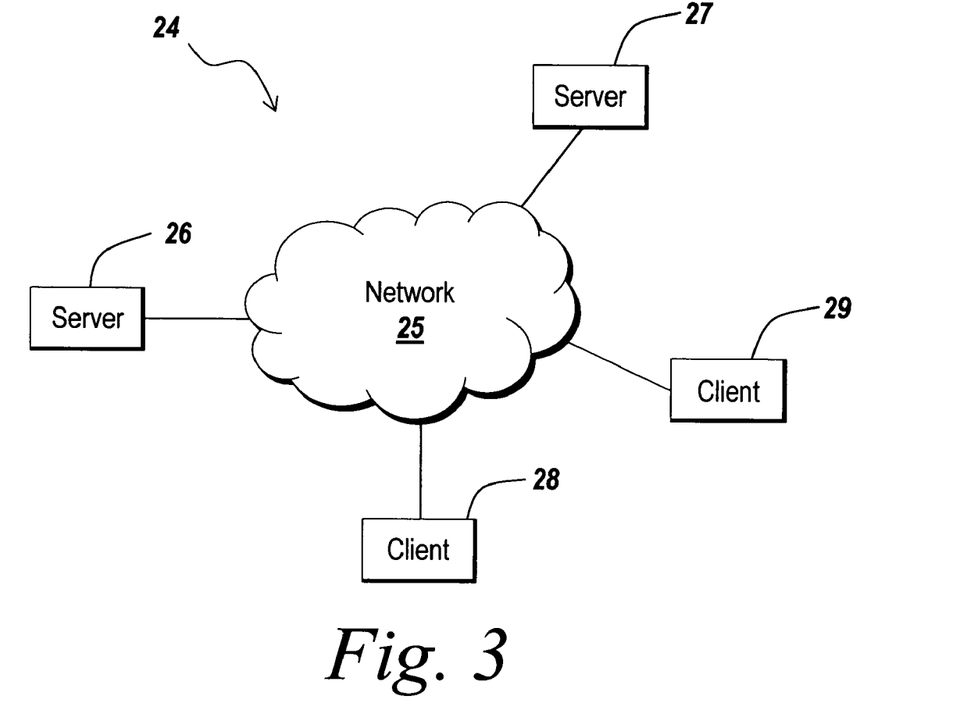
FIG. 3 is an exemplary network environment that enables an online implementation of the present invention.

FIG. 3 is an exemplary network environment 24 suitable for the distributed implementation of the illustrative embodiment. The network environment 24 may include one or more servers 26 and 27 coupled to clients 28 and 29 via a communication network 25. The network interface 16 and the modem 15 of the computing device 10 enable the servers 26 and 27 to communicate with the clients 28 and 29 through the communication network 25. The communication network 25 may include Internet, intranet, LAN (Local Area Network), WAN (Wide Area Network), MAN (Metropolitan Area Network), wireless network (e.g., using IEEE 802.11 and Bluetooth), etc. The communication facilities can support the distributed implementations of the present invention.

In the network environment 24, the servers 26 and 27 may provide the clients 28 and 29 with software components or products under a particular condition, such as a license agreement. The software components or products may include those for providing a test environment. The software components or products may also include those for the viewer tool 8 coupled to the test environment 4. For example, the client 28 may perform the tests for testing the UUT using a software component provided by the server 26 and send the server 26 the test data for analysis. The server 26 then returns the analysis results to the client 28 and the client 28 may subsequently display the data to the user with the analyzed information on the data.

Figure 4:
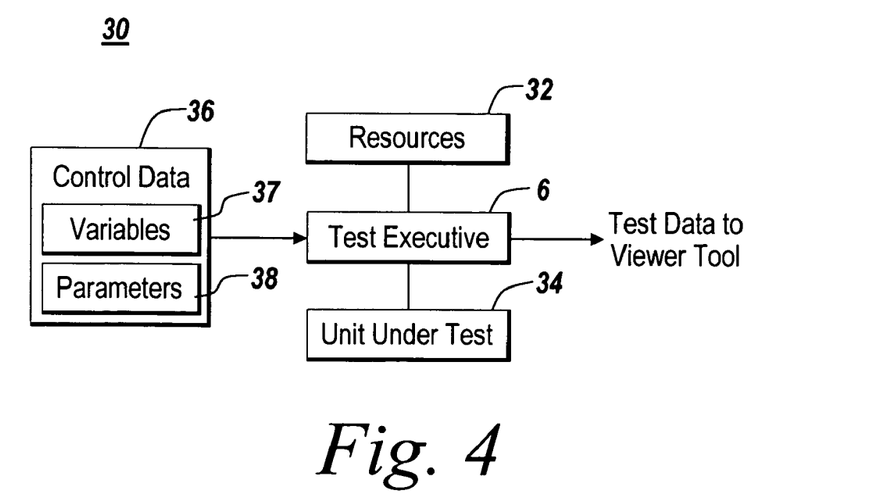
FIG. 4 shows an exemplary test environment depicted in FIG. 1.

FIG. 4 is an exemplary test environment 4 provided in the illustrative embodiment of the present invention. The test environment 4 includes a test executive 6 for managing various types of resources 32 for testing the UUT 34. A user may input control data 36 for setting the conditions of the tests executed in the test environment 4. The users may input control data 36 for making a sequence of the tests that specifies the sequence of the resources to be executed by the test executive 6. The users may also input the variables 37 and parameters 38 of the tests that can be used as arguments to call the functions provided by the resources 32. The UUT 34 can be tested by the test executive 6 with different variables 37 and parameters 38. With different variables 27 and parameters 38 of the tests, the functions of the resources 32 may return different outputs. The parameters 38 specify the conditions of the tests when the tests are executed, while the variables are collected during the tests. The variables 37 and parameters 38 can be dependent on or independent of the tests. Those of ordinary skill in the art will appreciate that the UUT 34 may include software and/or hardware.

In an embodiment of the present invention the tests can be executed in parallel to test the UUT 34. The parallel execution of the tests is described in more detail in co-pending U.S. patent application Ser. No. 11/028,171 ("DISTRIBUTED SYSTEMS IN TEST ENVIRONMENTS" filed on Dec. 30, 2004, and U.S. patent application Ser. No. 11/301,061 ("INSTRUMENT-BASED DISTRIBUTED COMPUTING SYSTEMS") filed on Dec. 12, 2005, the content of which is incorporated herewith by reference.

The resources 32 may include various programs provided in text-based or graphical programming tools. The resources 32 can also include data and the test environment 4 may test the data, such as the limit values of the data. The resources 32 may also include functions provided in software products. One of ordinary skill in the art will appreciate that the programs, data, functions are illustrative objects tested in the test environment 4 and the test environment 4 may test other resources, such as resources relating to hardware. Exemplary software products can be found in MATLAB®, Simulink®, MATLAB® Toolboxes, Simulink® Blocksets, all from The MathWorks, Inc. of Natick, Mass. One of skill in the art will appreciate that these software products are illustrative and the resources 32 may include other software products.

MATLAB® is an intuitive language and provides a technical computing environment. The MATLAB® environment integrates mathematical computing, visualization, and a powerful technical language. MATLAB® provides core mathematics and advanced graphical tools for data analysis, visualization, and algorithm and application development. MATLAB® provides a range of computing tasks in engineering and science, from data acquisition and analysis to application development. Built-in interfaces of MATLAB® enable users to access and import data from instruments, files, and external databases and programs. In addition, MATLAB® enables the users to integrate external routines written in C, C++, Fortran, and Java with the MATLAB® applications.

Simulink® enables users to design block diagrams for target systems, simulate the systems' behavior, analyze the performance of the systems, and refine the design of the systems. Simulink® provides block diagram environments that allow users to draw, edit, annotate, save, and print out the block diagrams of the target systems. Simulink® provides a graphical user interface (GUI) component that allows drafting of block diagram models by users. The visual representation of the target systems in the block diagrams allows for a convenient interpretation of the target systems and provides an intuitive notion of the behavior of the target systems. Simulink® also allows users to simulate the designed target systems to determine the behavior of the systems.

MATLAB® Toolboxes include a plurality of Toolboxes, such as Instrument Control Toolbox. The Instrument Control Toolbox provides communications with instruments, such as oscilloscopes and function generators, directly from MATLAB. Instrument Control Toolbox supports for GPIB, VISA, TCP/IP, and UDP communication protocols. Users may generate data to send out to an instrument, or read data for analysis and visualization. The transferred data can be binary or ASCII. The Instrument Control Toolbox supports both synchronous and asynchronous read and write functions. A synchronous operation blocks access to the command line until the read or write is completed. An asynchronous operation does not block access to the command line, and additional MATLAB® commands can be issued while the read or write operation executes.

Simulink® Blocksets contain application specific blocks that support the modeling and simulation of systems in the block diagram environment provided by Simulink®. Simulink® Blocksets provide blocks that are incorporated into the models of the systems, and include subsets, such as Signal Processing Blockset, Fixed-point Blockset and Communications Blockset, from The MathWorks, Inc. of Natick, Mass. The Blocksets provide utilities for the development and integration of models for the systems and sub-systems of the systems.

The test environment 4 is described in co-pending U.S. patent application Ser. No. 10/723,943 ("MONITORING TEST STEPS IN TEST ENVIRONMENTS") filed on Nov. 26, 2003 and U.S. patent application Ser. No. 10/925,413 ("TEST MANAGER FOR INTEGRATED TEST ENVIRONMENTS") filed on Aug. 24, 2004, which are incorporated by reference.

Figure 5:
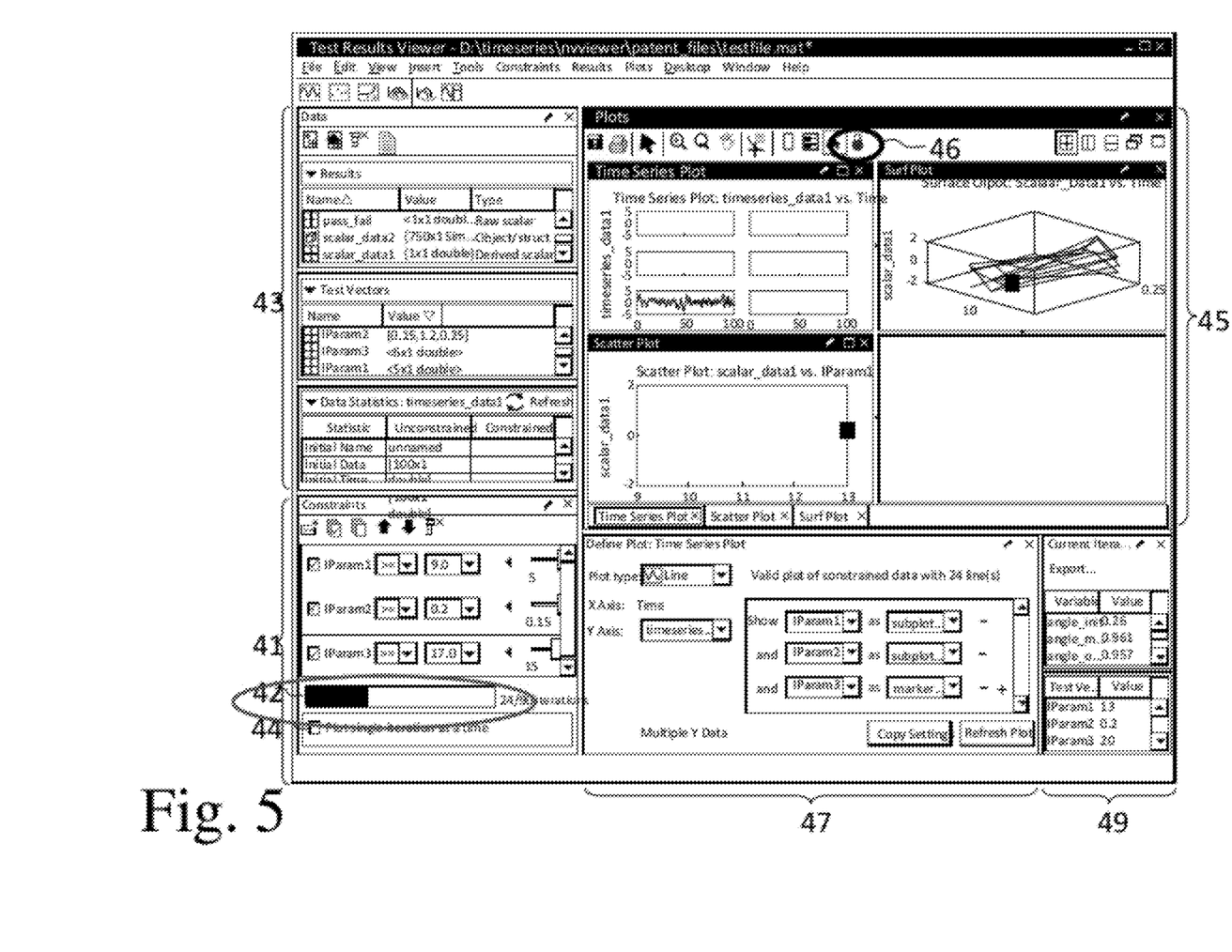
FIG. 5 is an exemplary user interface provided in the illustrative embodiment.

Referring back to FIG. 1, the viewer tool 8 receives data from the test environment 4 and analyzes the data to provide a user with information on the data. The viewer tool 8 may include user interfaces 9 for receiving inputs from the user that can be used as rules or criteria for selecting and analyzing the data. The user interfaces 9 may also display the analyzed data to the user. FIG. 5 shows an exemplary user interface 40 provided in the illustrative embodiment. The user interface 40 may include Constraints pane 41, Data pane 43, Plots pane 45, Define Plot pane 47, and Selected Test (or Current Iteration) Result pane 49. The Constraints pane 41 enables the user to input mathematical or logical criteria for including and excluding a portion of the tests to be viewed or analyzed in the tool 8. The Constraints pane 41 will be described below in more detail with reference to FIGS. 6-8. The Data pane 43 displays the variables 37 and parameters 38 of the tests. The Data pane 43 may also display data information of a particular or selected variable or parameter. The Data pane 43 will be described below in more detail with reference to FIGS. 9-10B. The Plots pane 45 provides various plots of the data with the values of variables and parameters. The Define Plot pane 47 shows the properties of each plot, such as the properties of axes in each plot, displayed in the Plots pane 45. The user can set up or modify the properties of the plots. The Plots pane 45 and the Define Plot pane 47 will be described below in more detail with reference to FIGS. 11-12. The Selected Test (or Current Iteration) Result pane 49 shows the data of the variables and parameters of a selected or current test. One of ordinary skill in the art will appreciate that these panes are illustrative and not limiting the scope of the present invention.

Figure 6:
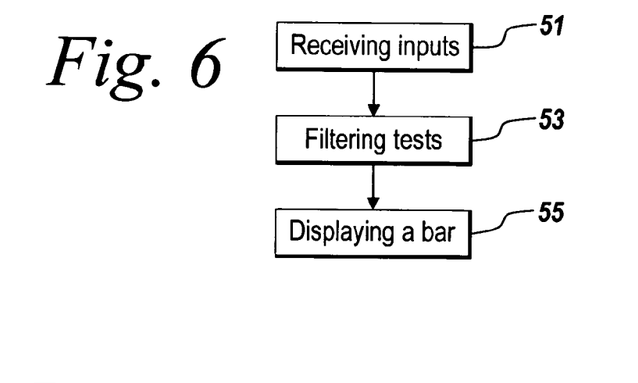
FIG. 6 is a flow chart showing an exemplary operation of the viewer tool depicted in FIG. 1.

FIG. 6 is a flow chart showing an exemplary operation of the viewer tool 8 for including and excluding tests. The tool 8 may receive user inputs for selecting tests through the user interface 40 (step 51). The user may input mathematical or logical criteria of parameters for including and excluding tests to be viewed and analyzed in the tool 8. In the illustrative embodiment, for example, mathematical filtering criteria are input for the parameters, Iparam1 and Iparam4, and a logical filtering rule is input for the parameter, Iparam3. The tool 8 then filters the tests based on the user-defined criteria and selects tests that meet the filtering criteria or rules (step 53). The tool 8 then displays a bar 42 to show how many tests are included and excluded by the combination of the mathematical or logical filtering criteria or rules. The relative length of the bar 42 represents the proportion of the tests filtered by the filtering criteria. In this example, 24 tests are selected from 90 tests.

Figure 7:
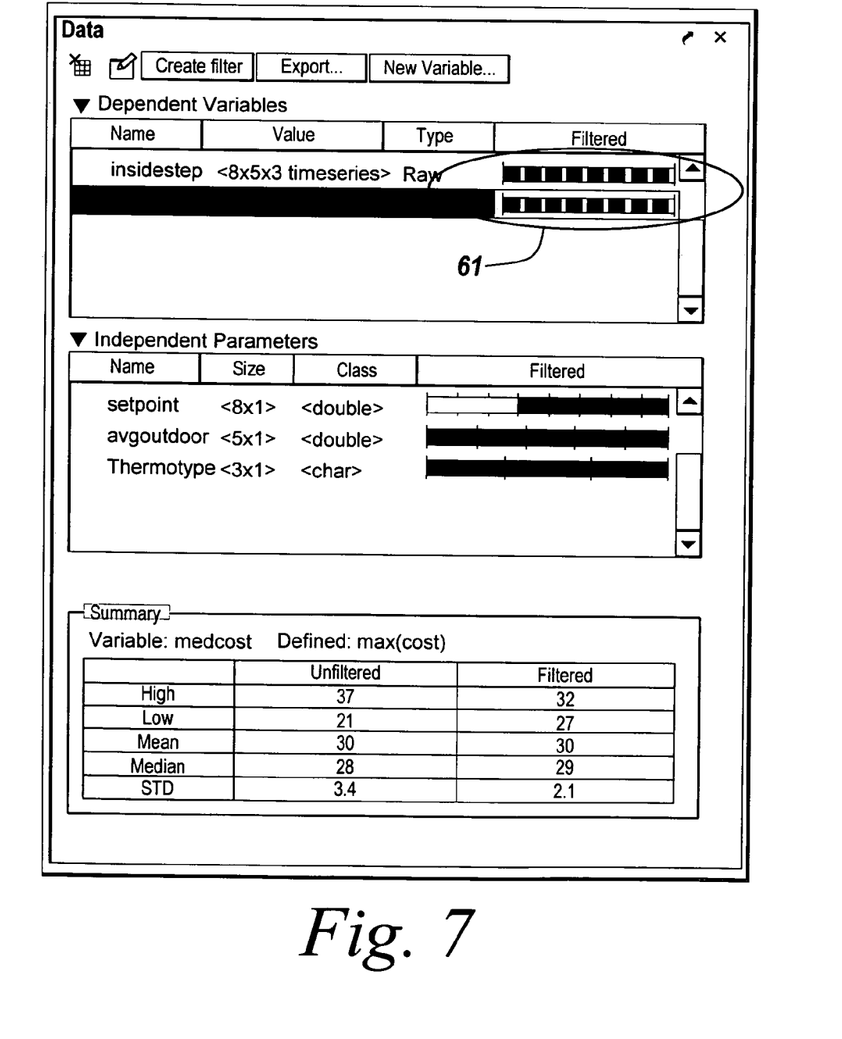
FIG. 7 is another exemplary user interface provided in the illustrative embodiment.

In another embodiment, a striated bar 61 can be used instead of the solid bar 42, as shown in FIG. 7. The striation can provide a graphical summary of the tests selected by the application of mathematical or logical filtering criteria. The striated bar 61 can provide a positional representation of which tests are included and excluded by the filtering criteria. For example, the stripes in the striated bar 61 may represent the tests included by the filtering criteria and the blank areas between the stripes may represent the tests excluded by the filtering criteria. Each test may be indexed and the positional information of each test can be determined by the index of each test. Also, the test results of each test can be saved in the storage 13 based on the index of each test. The striated bar 61 can provide rapid feedback to the user on the extent of tests excluded by the criteria (the density of the striations) and the distribution of included tests over the entire set of tests (the dispersion of the striations).

In the illustrative embodiment, the difference between the solid bar 42 and the striated bar 61 is that the striated bar 61 represents the distribution of a particular variable among the set of filtered tests whereas the solid bar 42 merely graphically conveys the proportion of all the tests represented after filtering has been applied. The conceptual model for generating the striated bars 61 is as follows:

For a given variable the left hand limit of the bar represents the minimum value of that variable among all the tests and the right hand end of the bar represents the maximum value among all tests. The bar is then partitioned into intervals between these limits, each one representing the value of that variable for one of the tests. A given interval is filled in if the corresponding test is included in the filtered set, and not filled in otherwise. The result is a striated appearance, showing a dark color if that range of the variable is represented in the set of filtered tests and a light color otherwise. The resulting image conveys how richly represented the range of values of a particular variable is within the filtered set of tests. It does not necessarily reflect what proportion of the tests has been selected. In this respect the striated bar and the solid bar have contrasting functions. Consider the following example: A variable X takes one of two values, either 0 or 1 among all tests. Those tests are filtered so that fully 90% of all the tests are selected, but the value of the variable X in that selected set includes only and no 0's. In this case the striated bar for the variable X would appear half colored dark to the right of the midpoint, representing that only the value 1 is represented among the filtered tests, i.e., only the upper 50% of all possible values of X are represented in the filtered tests. The solid bar 42 would appear 90% dark, representing that 90% of all the tests have been selected. This situation would convey to the user that despite selecting most of the tests, the filtering operation does not represent a wide range of possible values for the variable X.

Figures 8, 9, 10A:
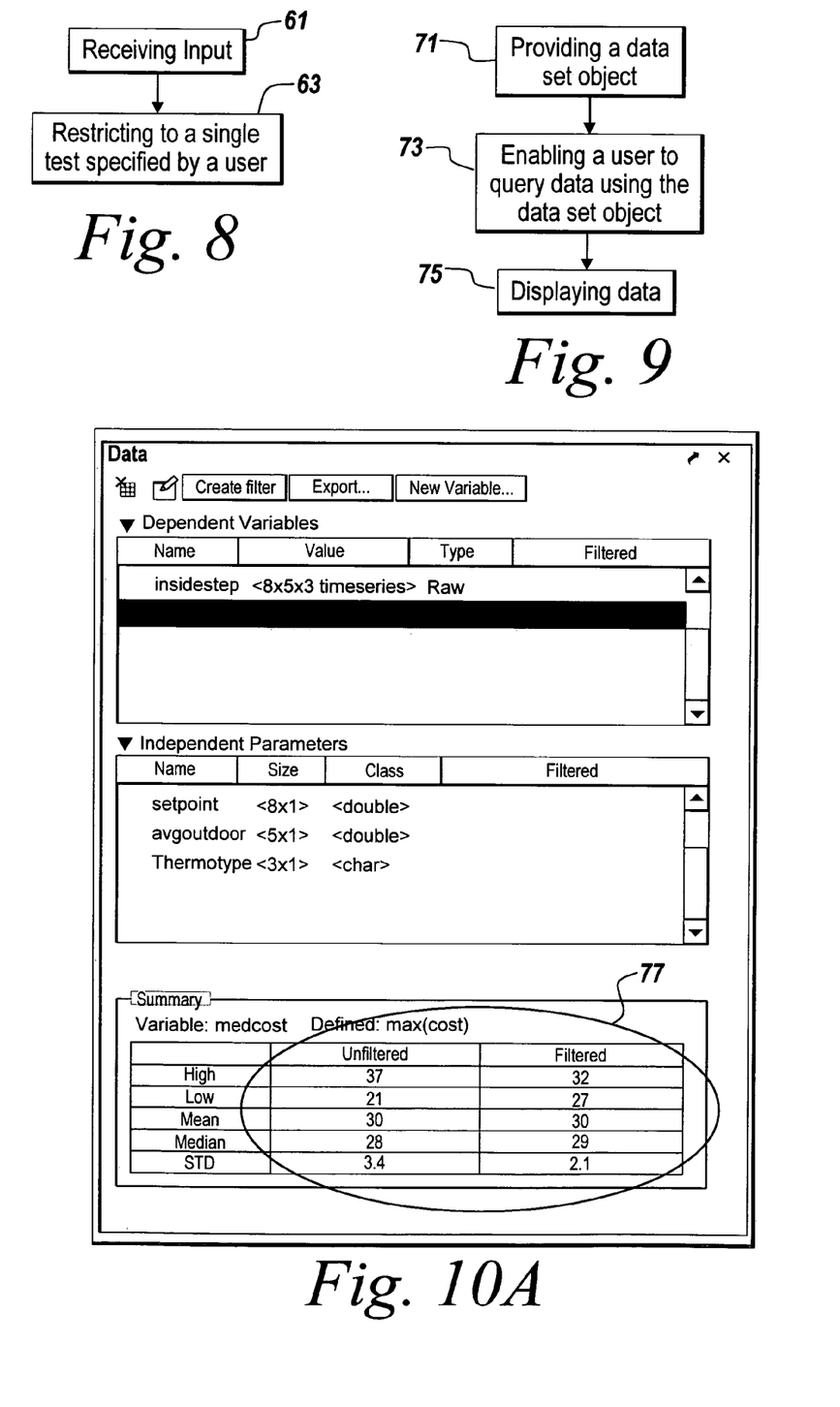
FIG. 8 is a flow chart showing another exemplary operation of the viewer tool depicted in FIG. 1.
FIG. 9 is a flow chart showing another exemplary operation of the viewer tool depicted in FIG. 1.
FIG. 10A is another exemplary user interface provided in the illustrative embodiment.

FIG. 8 is a flow chart showing an exemplary operation of the viewer tool 8 for including a single test. Generally, the viewer tool 8 displays data from multiple tests that are constrained or filtered by various mathematical or logical criteria. The illustrative embodiment may enable a user to restrict the set of tests to a single test using various graphical widgets to step through the set one test at a time. In the illustrative embodiment, the user interface 40 receives user inputs 44 for selecting a single test (step 61). The user may specify one of the filtered tests. For example, the user can specify a test from the 125 filtered tests. The tool 8 then restricts to the specified test and displays the data from the specified test (step 63). In the illustrative embodiment, the user interface 40 provides a button and a text box to locate a particular test. This feature is particularly useful for viewing variables which do not lend themselves to visualization in large arrays (e.g. images) or where the display even within a single test may provide useful information (e.g., a time series). By stepping through the sequence of tests one test at a time, the user can view a sequence of images or time series and gain intuition on how the time series or images evolve as the user passes through the test sequence.

FIG. 9 is a flow chart showing an exemplary operation of the viewer tool 8 for displaying data on the Data pane 43. The viewer tool 8 provides a data set object to link the collection of various data (with varying types) and the conditions defined for each of the tests (step 71). The methods and properties of the object may allow the user to query the data of the tests that meet a requirement defined by the user. The tool 8 extracts the data for specific tests (step 73) and provides the summary information of the data (step 73). In the illustrative embodiment, a tabular view is provided to display a summary of the characteristics of each of the variables and parameters in the tests. Information displayed in the tabular view may include data type, size, and an indication of whether the data is editable or plot-able.

In the illustrative embodiment, the viewer tool 8 may provide a tabular statistical summary 77 for each selected variable, as shown in FIG. 10A. The statistics may be based on the values of the selected variable across all tests or the constrained/filtered set of tests defined by applying the mathematical and logical filleting criteria. The displayed information depends on the variable data type. For example, the summary for time series objects contains information on the time vector variation across the set of tests. The summary for scalars (within each test) may contain descriptive statistical information describing the variation of that quantity among the tests. The summary information for the filtered set of tests will update when the filtering rules are modified.

Figure 10B:
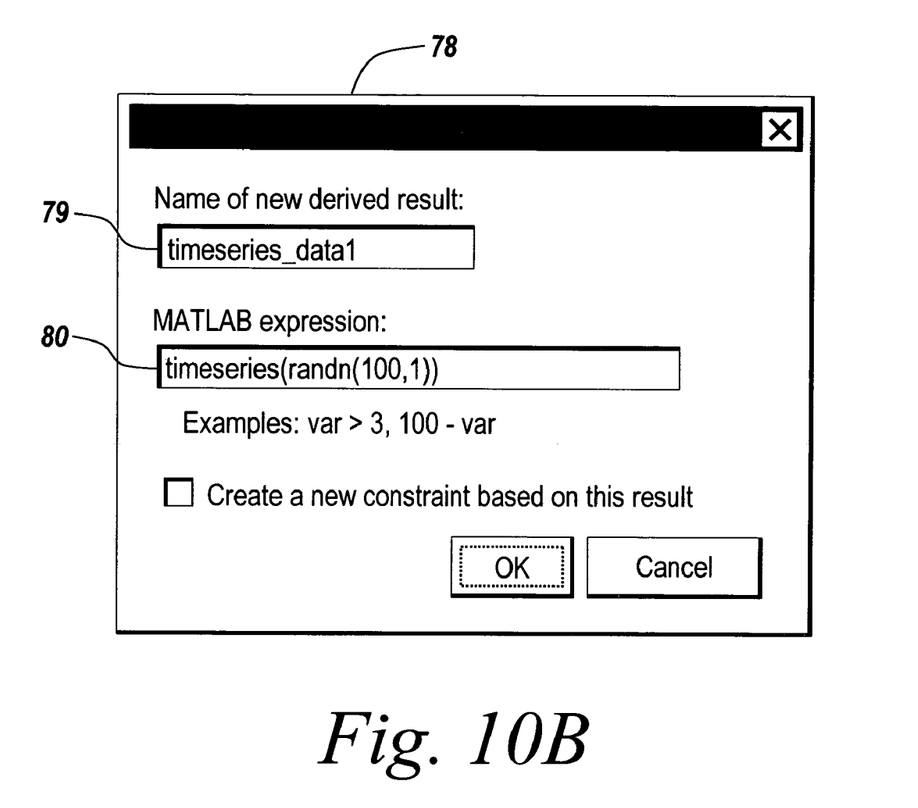
FIG. 10B is an exemplary user interface that allows a user to specify a new variable as an expression in terms of other variables in the illustrative embodiment.

The illustrative embodiment may enable a user to add one or more new variables using a mathematical formula. FIG. 10B is an exemplary user interface 78 which allows the user to specify this formula as an expression in terms of other variables in the data set. The user interface 78 may enable the user to input the name 79 (timeseries_data1) of a new variable. The user interface 78 may also enable the user to specify a MATLAB expression 80 for the new variable. This feature may be useful when the user needs to view a quantity which was not recorded in the test result data set but which can be derived from measurements which were recorded. For instance, the variables 'distance' and 'time' may have been recorded in a set of tests but not 'speed'. However, the user however can use this feature to calculate the speed from the ratio of the other two variables and view it as if it were recorded. This feature may also be useful when the user needs to filter the data set using a quantity which was not recorded in the data set but which can be inferred from measurements. A common case is the use of a maximum or minimum value of a vector or time series. In this situation the time series or vector cannot be used directly to filter tests since filtering variables must be scalar for each test, but a new scalar variable can be calculated as the maximum or minimum value or the time series/vector and that calculated variable used to filter the tests.

Figure 11:
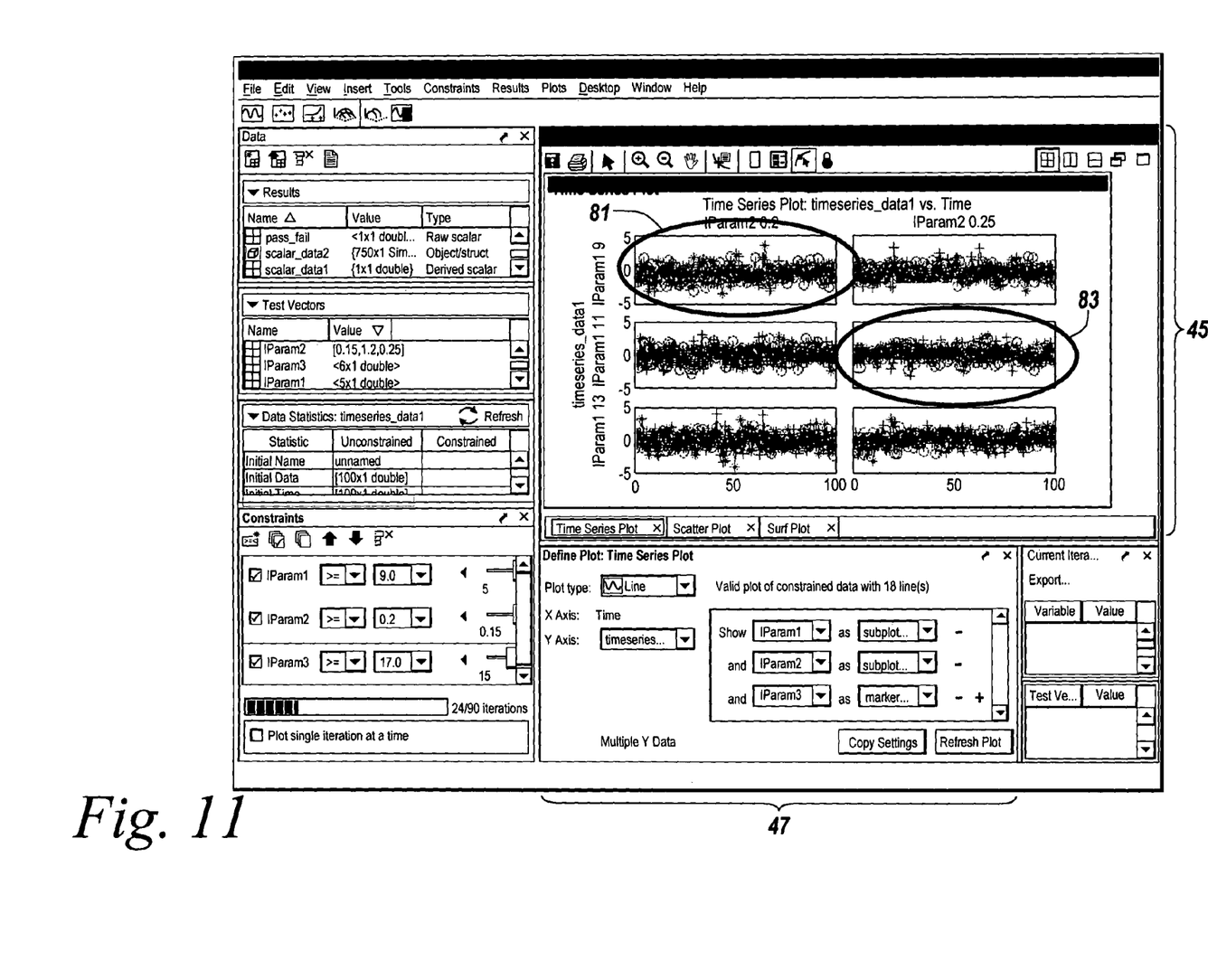
FIG. 11 is an exemplary user interface for providing subspaces in the illustrative embodiment.

The illustrative embodiment distinguishes subspaces of the data using rows, columns, markers, colors, etc. and enables a user to explore the relationship between a variable and more than two other variables. With this feature, the illustrative embodiment can visualize how the variables of the tests depend on each other as the test conditions are varied. For example, in FIG. 11, Time Series Plot pane of the Plots pane 45 plots the data of a variable (timeseries_data1) with respect to time. The Define Plot pane 47 of this plot is depicted in FIG. 11. The Define Plot pane 47 shows that the x-axis of the plot is time and y-axis of the plot is the timeseries_data1 variable. The Define Plot pane 47 also provides an option 48 for displaying subspaces of the data that depend upon additional variables. In the illustrative embodiment, lines representing the variable timeseries_data1 are positioned in axes at row and column locations which are defined by the values of Iparam1 and Iparam2 in each corresponding test. Consequently, the collection of lines representing the values of the variable timeseries_data1 is distinguished by differing associated values of Iparam1 and Iparam2. Furthermore, the option 48 defines that differing values of the variable Iparam3 should be displayed using different marker types. In response to the user inputs for setting these options, the tool 8 plots subspaces of the data on the Plots pane 45, as depicted in FIG. 11.

For example, the subspace 81 plots timeseries_data1 variable with respect to time under the condition that the values of the Iparam1 and Iparam2 parameters are 9 and 0.2, respectively. Various values of the Iparam3 parameter are distinguished within that set of axes by showing lines with various marker types depending on the different values of Iparam3. For another example, the subspace 83 plots the timeseries_data1 variable with respect to time under the condition that the values of the Iparam1 and Iparam2 parameters are 11 and 0.25, respectively. In the illustrative embodiment, the relationship between a variable and up to six other variables can be shown across multiple tests by using the following subspace distinctions:

Variable 1: x position
Variable 2: y position
Variable 3: Rows of the subspaces
Variable 4: Columns of the subspaces
Variable 5: Color in which the data is displayed
Variable 6: Marker used to highlight the data The illustrative embodiment of the present invention automatically updates the plots and views of data in the Plots pane 45 when the user modifies the filtering criteria on the Constraints pane 41. The automatic update reflects any changes in the set of filtered tests when the mathematical or logical filtering criteria are modified. This feature allows the user to constrain or filter the tests in various ways and observe the effect on the data set from the multiple perspectives represented by the various plots.

In another embodiment, in order to compare the data generated by two or more different sets of filtering criteria, the user is able to break the link between plots and the current filtered set of tests to display a 'snapshot' of data derived from a previous filtering criteria. This control of the link is provided by a lock/unlock status 46 for each plot in the Plots pane 45, as depicted in FIG. 5. Locking freezes the plot in its current state making it independent of any changes to the filtering criteria defining the current set of tests. Unlocking the plot causes it to reflect and track the set of tests defined by the current set of criteria.

Figure 12:
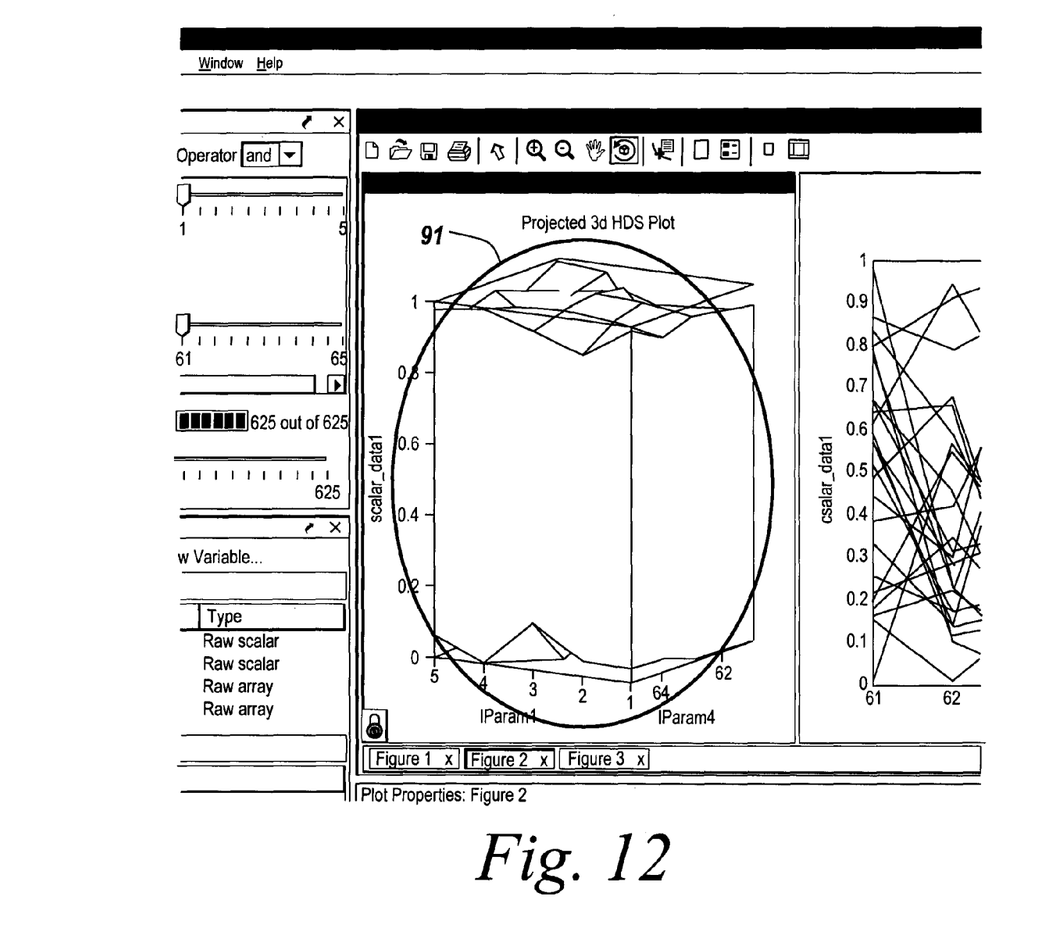
FIG. 12 is an exemplary user interface for providing an envelope of data in the illustrative embodiment.

The illustrative embodiment of the present invention may provide an envelope view of data from the tests. FIG. 12 shows an exemplary user interface displaying an envelope view 91 of data in the illustrative embodiment. In many applications, the unconstrained/unfiltered number of tests may be large and consequently plots showing the relationship between variables across all tests may require a large number of graphical elements. Depending on the scale, software and hardware limitations may prevent the display of such a large set of graphical elements in a usable form. While the user can always constrain or filter the tests to obtain a more manageable set, the user often needs to view the entire data set in order to gain insight into before meaningful filtering criteria can be applied.

The enveloping feature of the illustrative embodiment moderates the affect of hardware and software limitations when the number of constrained or unconstrained tests is large, by limiting the number of graphical elements that need to be plotted. In the illustrative embodiment, the envelope of the data can be provided by drawing a graphical hull or envelope around clusters of graphical elements rather than showing each element individually. This reduces the detail shown on the plots but preserves the macroscopic features of the relationship being viewed. The user can then define filtering criteria to constrain/filter the data to obtain a more detailed view of a smaller set of tests. The viewer tool 8 of the illustrative embodiment defines an envelope using the maximum and minimum values of the data within a particular region, and the resulting envelope then appears as a solid object as shown in FIG. 12. In another embodiment, the envelope can be shaded to provide an indication of the density of graphical objects in each part of the region.

The viewer tool 8 of the illustrative embodiment provides callback functions for implementing the features of the present invention. The callback functions may be provided to select tests by applying the filtering criteria specified by a user. The callback functions may also be provided to analyze the data generated from the filtered tests. The analysis can generate the statistics information of variables over the tests, an envelope of the data, and the subspaces of data. Those of ordinary skill in the art will appreciate that the callback functions are illustrative and not limiting the scope of the present invention.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. In a computing device, a method for displaying data on a display, the method comprising the steps of:
   receiving data generated from a plurality of tests, each of the plurality of tests perform testing of a unit under test in a test environment, the data received with a viewer tool coupled to the test environment;
   receiving with the viewer tool user input mathematical filtering criteria or logical filtering criteria associated with the plurality of tests;
   including or excluding at least a portion of the plurality of tests of the unit under test in the viewer tool based on the mathematical filtering criteria or logical filtering criteria; and
   displaying data on the display or excluding data from the display that is generated from the plurality of tests based on the filtering criteria,
   the displayed data including the display of a graphical object providing a positional representation indicating which of the plurality of tests are included or excluded based on the filtering criteria.

2. The method of claim 1, further comprising the step of:
   displaying a graphical object for providing proportional information of the portion of the plurality of tests relative to the plurality of tests.

3. The method of claim 1, further comprising the steps of:
   enabling a user to select a single test; and
   displaying the data generated from the single test.

4. The method of claim 1, further comprising the steps of:
   providing a data set object representing the data generated from the portion of the plurality of tests; and
   enabling a user to query the data using the data set object.

5. The method of claim 4, further comprising the step of:
   displaying a visual representation of the data set object, wherein the visual representation displays characteristics of the queried data.

6. The method of claim 1, further comprising the step of:
   displaying statistics of a variable over the plurality of tests or the portion of the plurality of tests.

7. The method of claim 1, further comprising the step of:
   defining variables in the plurality of tests; and
   displaying a relationship between a variable and more than two other variables using subsets of axes, colors or a marker.

8. The method of claim 1, further comprising the step of:
   enabling a user to lock or unlock the data displayed on the display, wherein locking the data prevents the data displayed on the display from being updated by modifying the criteria.

9. The method of claim 1, further comprising the step of:
   displaying an envelope of the data using maximum or minimum values of the data.

10. The method of claim 9, further comprising the step of:
    shading the envelope of the data to provide a density of maximum or minimum values the data.

11. The method of claim 1, wherein the plurality of tests are executed in parallel for testing a unit under test in the test environment.

12. The method of claim 1, wherein the unit under test comprises software or hardware.

13. The method of claim 1, wherein the computing device comprises a multi-core processor and the method is performed by the multi-core processor.

14. A system for displaying data on a display, the system comprising:
    a test environment for testing a unit under test, the test environment performs a plurality of tests on the unit under test and generates data from the plurality of tests for the unit under test;
    a viewer tool coupled to the test environment for receiving user input mathematical filtering criteria or logical filtering criteria associated with the plurality of tests to select at least a portion of the plurality of tests, the viewer tool including or excluding at least a portion of the plurality of tests for the unit under test based on the mathematical or logical filtering criteria; and
    a display displaying or excluding the data that is generated from the plurality of tests based on the filtering criteria, the displayed data including the display of a graphical object providing a positional representation of which of the plurality of tests for the unit under test are included or excluded in the viewer tool based on the filtering criteria.

15. The system of claim 14, wherein the test environment comprises:
    a test executive for managing code executed to test the unit under test and providing the data to the viewer tool.

16. The system of claim 14, wherein the viewer tool comprises:
    a first user interface for displaying a graphical object for providing proportional information of the portion of the plurality of tests relative to the plurality of tests.

17. The system of claim 14, wherein the viewer tool enables a user to select a single test and, in response to user's selection, displays the data generated from the single test.

18. The system of claim 14, further comprising:
    a data set object for representing the data generated from the portion of the plurality of tests, wherein the viewer tool enables a user to query the data using the data set object.

19. The system of claim 18, wherein the viewer tool comprises:
    a third user interface for displaying a visual representation of the data set object, wherein the visual representation displays characteristics of the queried data.

20. The system of claim 14, wherein the viewer tool comprises:
    a fourth user interface for displaying statistics of a variable over the plurality of tests or the portion of the plurality of tests.

21. The system of claim 14, wherein the viewer tool displays a relationship between a variable and more than two other variables using subsets of axes, colors or a marker.

22. The system of claim 14, wherein the viewer tool comprises:
    a fifth user interface for enabling a user to lock or unlock the data displayed on the display, wherein locking the data prevents the data displayed on the display from being updated by modifying the criteria.

23. The system of claim 14, wherein the viewer tool comprises:
    a sixth user interface for displaying an envelope of the data using maximum or minimum values of the data.

24. The system of claim 23, wherein the envelope of the data is shaded to provide a density of maximum or minimum values the data.

25. The system of claim 14, wherein the plurality of tests are executed in parallel for testing a unit under test in the test environment.

26. The system of claim 14, wherein the unit under test comprises software or hardware.

27. The system of claim 14, further comprising a multi-core processor for running the test environment and the viewer tool.

28. A non-transitory computer-readable medium holding computer-executable instructions that when executed cause a computing device to:
 receiving data generated from a plurality of tests, each of the plurality of tests perform testing of a unit under test in a test environment, the data received with a viewer tool coupled to the test environment;
 receiving with the viewer tool user input mathematical filtering criteria or logical filtering criteria associated with the plurality of tests;
 including or excluding at least a portion of the plurality of tests of the unit under test in the viewer tool based on the mathematical filtering criteria or logical filtering criteria; and
 displaying data on the display or excluding data from the display that is generated from the plurality of tests based on the filtering criteria, the displayed data including the display of a graphical object providing a positional representation indicating which of the plurality of tests are included or excluded based on the filtering criteria.

29. The computer-readable medium of claim 28 wherein the instructions when executed further cause the computing device to:
 display a graphical object for providing proportional information of the portion of the plurality of tests relative to the plurality of tests.

30. The computer-readable medium of claim 28 wherein the instructions when executed further cause the computing device to:
 enable a user to select a single test; and
 display the data generated from the single test.

31. The computer-readable medium of claim 28 wherein the instructions when executed further cause the computing device to:
 provide a data set object representing the data generated from the portion of the plurality of tests; and
 enable a user to query the data using the data set object.

32. The computer-readable medium of claim 31 wherein the instructions when executed further cause the computing device to:
 display a visual representation of the data set object, wherein the visual representation displays characteristics of the queried data.

33. The computer-readable medium of claim 28 wherein the instructions when executed further cause the computing device to:
 display statistics of a variable over the plurality of tests or the portion of the plurality of tests.

34. The computer-readable medium of claim 28 wherein the instructions when executed further cause the computing device to
 define variables in the plurality of tests; and
 display a relationship between a variable and more than two other variables using subsets of axes, colors or a marker.

35. The computer-readable medium of claim 28 wherein the instructions when executed further cause the computing device to:
 enable a user to lock or unlock the data displayed on the display, wherein locking the data prevents the data displayed on the display from being updated by modifying the criteria.

36. The computer-readable medium of claim 28 wherein the instructions when executed further cause the computing device to:
 display an envelope of the data using maximum or minimum values of the data.

37. The computer-readable medium of claim 36 wherein the instructions when executed further cause the computing device to:
 shade the envelope of the data to provide a density of maximum or minimum values the data.

38. The computer-readable medium of claim 28, wherein the plurality of tests are executed in parallel for testing a unit under test in the test environment.

39. The computer-readable medium of claim 28, wherein the unit under test comprises software or hardware.

40. The computer-readable medium of claim 28, wherein the computing device comprises a multi-core processor and the method is performed by the multi-core processor.

\* \* \* \* \*